United States Patent [19]
Nishiumi et al.

[11] Patent Number: 5,897,437
[45] Date of Patent: Apr. 27, 1999

[54] CONTROLLER PACK

[75] Inventors: Satoshi Nishiumi; Kazuo Koshima, both of Kyoto; Nobuyuki Nonaka, Tokyo, all of Japan

[73] Assignee: Nintendo Co., Ltd., Kyoto, Japan

[21] Appl. No.: 08/727,239

[22] Filed: Oct. 8, 1996

[30] Foreign Application Priority Data

Oct. 9, 1995 [JP] Japan ................................. 7-288006

[51] Int. Cl.$^6$ .................................................. G06F 3/033
[52] U.S. Cl. ........................................................... 463/47
[58] Field of Search ................................. 463/37, 38, 39, 463/47, 30; 345/161, 163; 364/188, 190

[56] References Cited

U.S. PATENT DOCUMENTS 5,691,898  11/1997  Rosenberrg et al. ..................... 463/38
5,734,373  3/1998  Rosenberg et al. ...................... 463/38

Primary Examiner—George Manuel
Attorney, Agent, or Firm—Nixon & Vanderhye PC

[57] ABSTRACT

A controller pack includes a case and a lid detachably attached to the case, and the controller pack is detachably attached to an opening portion of a controller. A vibration source is fixed to the lid. When a specific CPU address and data are outputted from terminals, an electric power of a battery is applied to the vibration source by a driver circuit, and therefor, the vibration source generates a vibration. The vibration generated by the vibration source is conveyed from the lid to the controller, and then, to hands of a player grasping the controller.

20 Claims, 16 Drawing Sheets

FIG. 10

| 1 BYTE | B | A | G | START | ↑ | ↓ | ← | → |
|---|---|---|---|---|---|---|---|---|
| 2 BYTE | JSRST | 0 | L | R | E | D | C | F |
| 3 BYTE | ← X ORDINATE → | | | | | | | |
| 4 BYTE | ← Y ORDINATE → | | | | | | | |

CONTROLLER PACK

FIELD OF THE INVENTION

The present invention relates to a controller pack. More specifically, the present invention relates to a novel controller pack which is detachably attached to a controller for game machine, and generates a vibration on the controller.

DESCRIPTION OF THE PRIOR ART

In the field of video game machines for business use, so-called bodily sensation game machines have been put into practical use, in which feelings of games are further increased by generating a vibration on a seat on which a player sits down or by inclining the seat.

Furthermore, computer games have been known, in which a vibration generating source is provided in a joy-stick, and a vibration is generated at the time of an attack to a player's own fighter from an enemy fighter in a shooting game, for example.

However, in the above described computer games, the vibration is generated on the joy-stick only, and therefore, a power is insufficient. Especially, in video game machines for home use such as "Super Family Computer" ("Super NES"), "NINTENDO 64" and the like, since a player plays games by grasping a controller using his or her hands, if the vibration is generated on the joy-stick only, it is difficult to transmit the vibration to the hands of the player grasping the controller.

Therefore, it is possible to consider that a vibration generating source be incorporated in a housing of the controller; however, in such a case, it is necessary to change the controller as a whole, and therefore, a person who intends to play games in which the vibration is generated must obtain a specific controller, and accordingly, it is not economical.

SUMMARY OF THE INVENTION

Therefore, a principal object of the present invention is to provide a novel controller pack capable of applying a bodily sensation to a player in a video game machine for home use.

The present invention is a controller pack detachably attached to a controller which is connected to a video game machine, comprising a case; a vibration source which is attached to the case and generates a vibration using electric power; and a driver circuit which applies the electric power to the vibration source in response to a command signal from the game machine.

The video game machine includes a game processor having a predetermined address space. If the game processor outputs the command signal to a specific address within the predetermined address space, a predetermined terminal provided on the controller pack receives the command signal. In response thereto, the driver circuit applies the electric power to the vibration source from a battery accommodated in the controller pack, for example. Therefore, the vibration source which is a motor, for example, generates the vibration. Since the vibration source is attached to the case of the controller pack, the vibration generated by the vibration source is conveyed to the controller to which the controller pack is attached. The controller is grasped by the hands of the player, and therefore, the vibration of the vibration source is conveyed to the hands.

In accordance with the present invention, it is possible to generate the vibration on the controller pack, i.e. the controller by the command signal from the game machine, and accordingly, in the video game machine for home use, it is possible to enjoy a so-called bodily sensation.

Furthermore, according to the present invention, if the vibration is to be generated in a specific game, it is possible to generate the vibration on the controller, simply by attaching the controller pack in which the vibration source is incorporated to the controller. Accordingly, it is not necessary to change the controller as a whole.

Furthermore, since the vibration generated on the controller pack is directly conveyed from the controller pack to the controller, it is possible to apply a relatively strong vibration to the hands of the player grasping the controller.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 10 is an illustrative view showing data of an analog joy-stick and respective buttons on the controller;

DETAILED DESCRIPTION OF THE PREFERRED EMBODIMENTS

Figure 1:
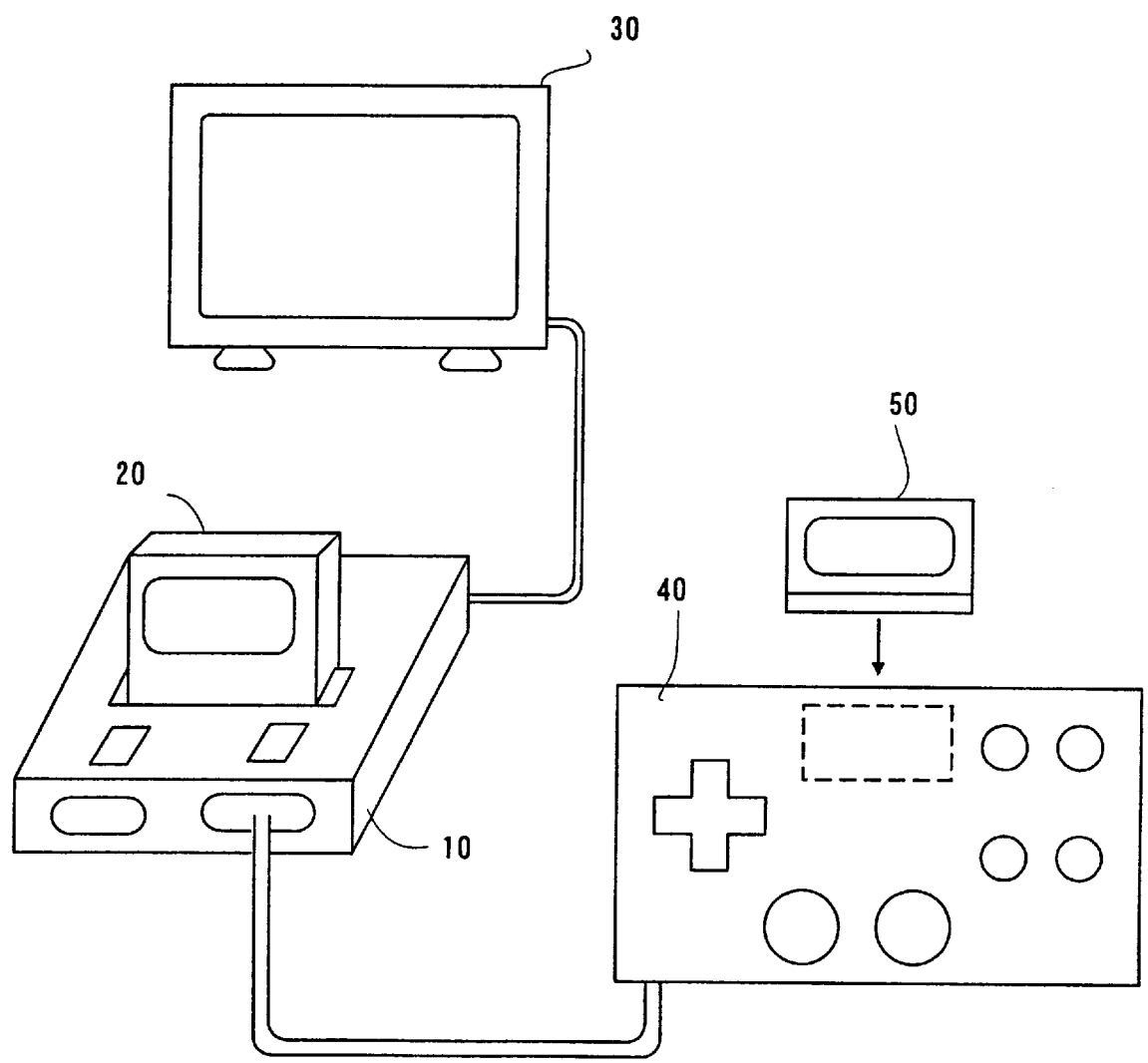
FIG. 1 is an illustrative view showing one example of a video game machine for home use to which a controller pack according to the present invention can be applied.

FIG. 1 is a view showing a system configuration of a 3-dimensional image processing system which is one example of a video game machine to which a controller pack according to the present invention can be applied. The image processing system is a video game system, for example, and constructed so as to include an image processor 10, a ROM cartridge 20 which is one example of an external storage device, a monitor 30 which is one example of a display means connected to the image processor 10, a controller 40 which is one example of an operation means, and a controller pack 50 (described later in detail) which is detachably attached to the controller 40. In addition, the external storage device stores image data, program data for image processing in a game and etc., and sound data of music and effective sounds and the like as necessary. The external storage device may be a CD-ROM or a magnetic disc instead of the ROM cartridge. As the operation means, an input device such as a keyboard, mouse and the like may be used in a case where the image processing system according to the embodiment is applied to a personal computer.

Figure 2:
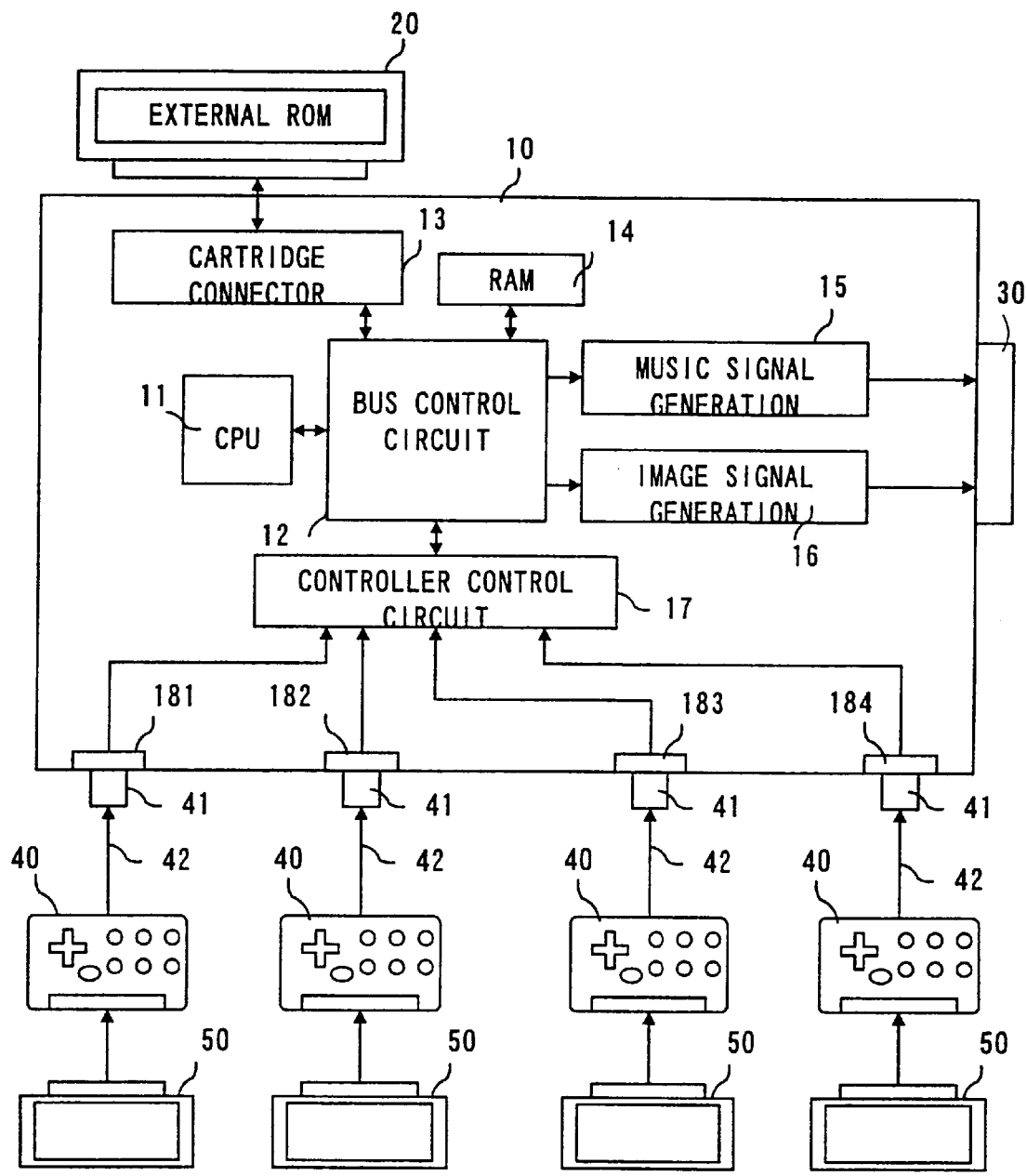
FIG. 2 is a block diagram showing in detail the video game machine of FIG. 1.

FIG. 2 is a block diagram of the image processing system of the embodiment. The image processor 10 incorporates a central processing unit (hereinafter, called a "CPU") 11 and a bus control circuit 12. A cartridge connector 13 for detachably attaching the ROM cartridge 20 to the processor 10 is connected to the bus control circuit 12, and a RAM 14 is further connected to the bus control circuit 12. Furthermore, a music signal generating circuit 15 which outputs a music signal processed by the CPU 11 and an image signal generating circuit 16 which is for outputting an image signal are connected to the bus control circuit 12. A controller control circuit 17 which transmits operation data of one or more controllers 40 and/or data of the controller pack 50 in a bit-serial fashion is connected to the bus control circuit 12. Controller connectors (hereinafter, simply called "connectors") 181–184, which are provided on a front surface of the image processor 10, are connected to the controller control circuit 17. The controllers 40 are detachably connected to the connectors via connection jacks 41 and cables 42. By connecting the controllers 40 to the connectors 181–184, the controllers 40 are electrically connected to the image processor 10, and therefore, it becomes possible to transmit or receive the data between the controllers 40 and the image processor 10.

More specifically, the bus control circuit 12 receives a command outputted in a bit-parallel fashion from the CPU 11 via a bus, performs a parallel-to-serial conversion of the command, and outputs the command to the controller control circuit 17 in a bit-serial fashion. The bus control circuit 12 further converts serial data input from the controller control circuit 17 into parallel data and output the same to the bus. The data outputted to the bus is processed by the CPU 11, or stored in the RAM 14. That is, the RAM 14 is a memory for temporarily storing the data to be processed by the CPU 11, and the data is read from or written into the RAM 14 via the bus control circuit 12.

Figure 3:
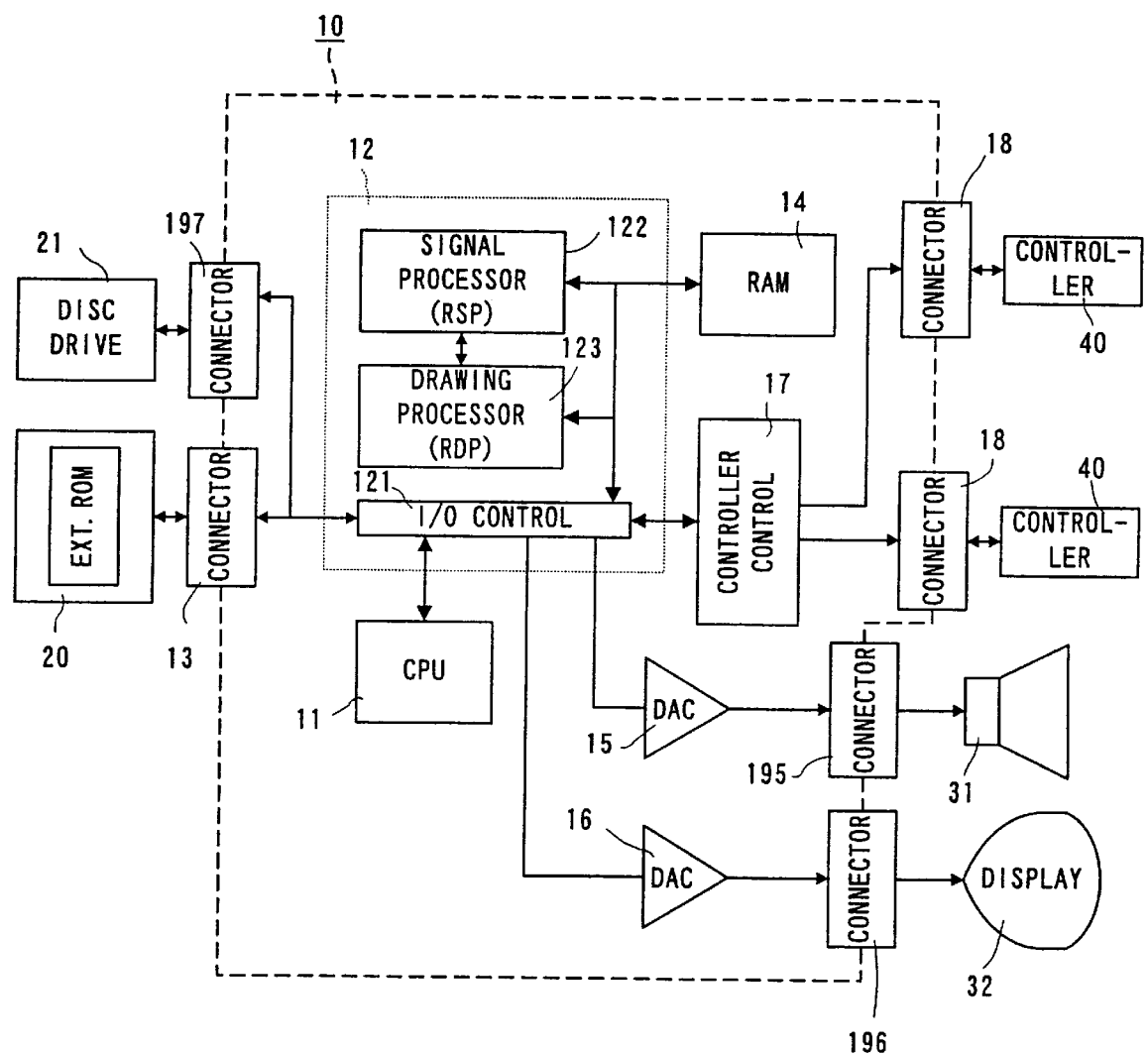
FIG. 3 is a block diagram showing in detail a bus control circuit in FIG. 2.

Furthermore, the bus control circuit 12 included in the image processor 10 shown in FIG. 2 is specifically constructed as a RCP (Reality Co-Processor) which is a RISC processor as shown in FIG. 3, and includes an I/O controller 121, a signal processor 122 and a drawing processor 123. The I/O controller 121 controls not only data transfer between the CPU 11 and the RAM 14 but also data flow between the signal processor 122 and the drawing processor 123 and the RAM 14 and the CPU 11. More specifically, the data from the CPU 11 is applied to the RAM 14 via the I/O controller 121, and the data from the RAM 14 is further sent to the signal processor 122 and the drawing processor 123 so as to be processed therein. The signal processor 122 and the drawing processor 123 process the music signal data and the image signal data sent from the RAM 14, and stores again the music signal data and the image signal data in the RAM 14. Then, the I/O controller 121 reads-out the music signal data and the image signal data from the RAM 14 according to instructions from the CPU 11, and applies the music signal data and the image signal data to the music signal generating circuit (D/A converter) 15 and the image signal generating the circuit (D/A converter) 16. The music signal is applied to a speaker 31 included in the TV monitor 30 through a connector 195. The image signal is applied to a display 32 included in the TV monitor 30 through a connector 196.

In addition, as shown in FIG. 3, a disc drive 21 capable of reading-out data from an optical disc or a magnetic disc and writing data on the optical disc or the magnetic disc may be connected to the image processor 10 instead of the external ROM 20 or together with the external ROM 20. In such a case, the disc drive 21 is connected to the RCP 12, i.e. the I/O controller 121 via a connector 197.

Figure 4:
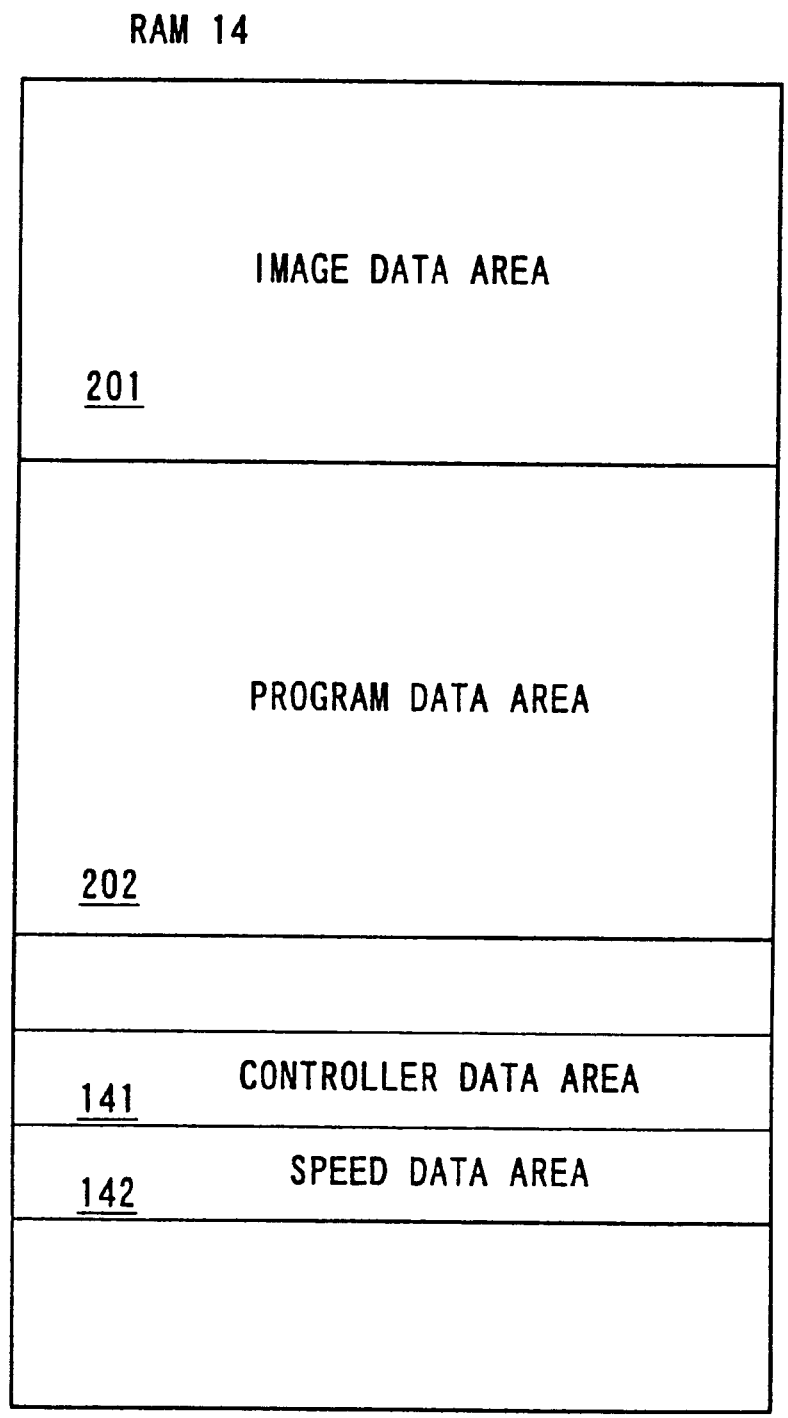
FIG. 4 is an illustrative view showing a memory map of a RAM of FIG. 2.

FIG. 4 is an illustrative view showing areas of memories assigned within a memory space of the CPU 11. The RAM 14 which can be accessed by the CPU 11 via the bus control circuit, or RCP 12 includes an image data area 201 which stores image data necessary for making the image processor 10 generate the image signal for a game, and a program data area 202 which stores program data necessary for performing predetermined operations by the CPU 11. In the program area 202, an image display program for performing an image display on the basis of the image data, a clock program for counting a time, and a determination program for determining whether or not the cartridge 20 and an expansion device 50 (described later) have a predetermined relationship are fixedly stored. The RAM 14 further includes a controller data area 141 which temporarily stores data indicative of an operation status from the controller and a speed data area 142 for storing data of a moving speed of an object (a moving speed that the object is moved within one frame of the display).

Figure 5:
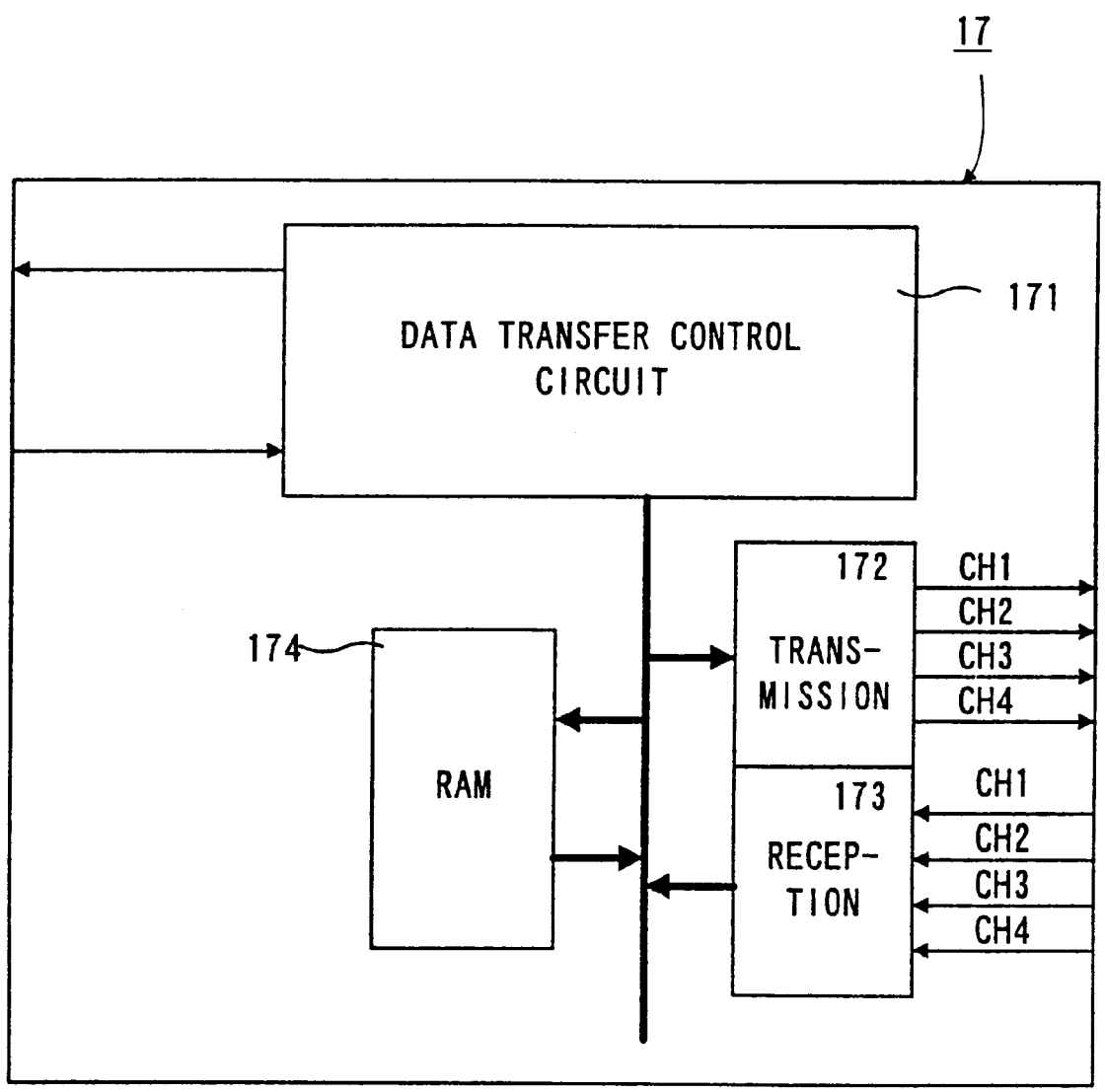
FIG. 5 is a block diagram showing in detail a controller control circuit of FIG. 2.

The controller control circuit 17 is provided for receiving or transmitting the data in a bit-serial fashion between the bus control circuit or RCP 12 and the connectors 181–184. As shown in FIG. 5, the controller control circuit 17 includes a data transfer control circuit 171, a transmission circuit 172, a reception circuit 173 and a RAM 174 for temporarily storing data to be transmitted or as received. The data transfer control circuit 171 includes a parallel-to-serial conversion circuit and a serial-to-parallel conversion circuit for converting data format in transmitting the data, and controls a writing or reading operation of the RAM 174. The serial-to-parallel conversion circuit converts serial data supplied from the bus control circuit 12 into parallel data to apply the parallel data to the RAM 174 or the transmission circuit 172. The parallel-to-serial conversion circuit converts parallel data supplied from the RAM 174 or the reception circuit 173 into serial data to apply the serial data to the bus control circuit 12. The transmission circuit 172 converts parallel data for controlling a reading-in operation of the signals of the controller being supplied from the data transfer control circuit 171 and parallel data to be written in the RAM cartridge 50, into serial data so as to transmit over channels CH1–CH4 corresponding to the plurality of controllers 40, respectively. The reception circuit 173 receives the data indicative of the operation status of the controllers 40 being inputted from the channels CH1–CH4 corresponding to the controllers 40 and data read-out from the RAM cartridge or controller pack 50 in a bit-serial fashion, and converts the serial data into parallel data to be applied to the data transfer control circuit 171.

Figure 6:
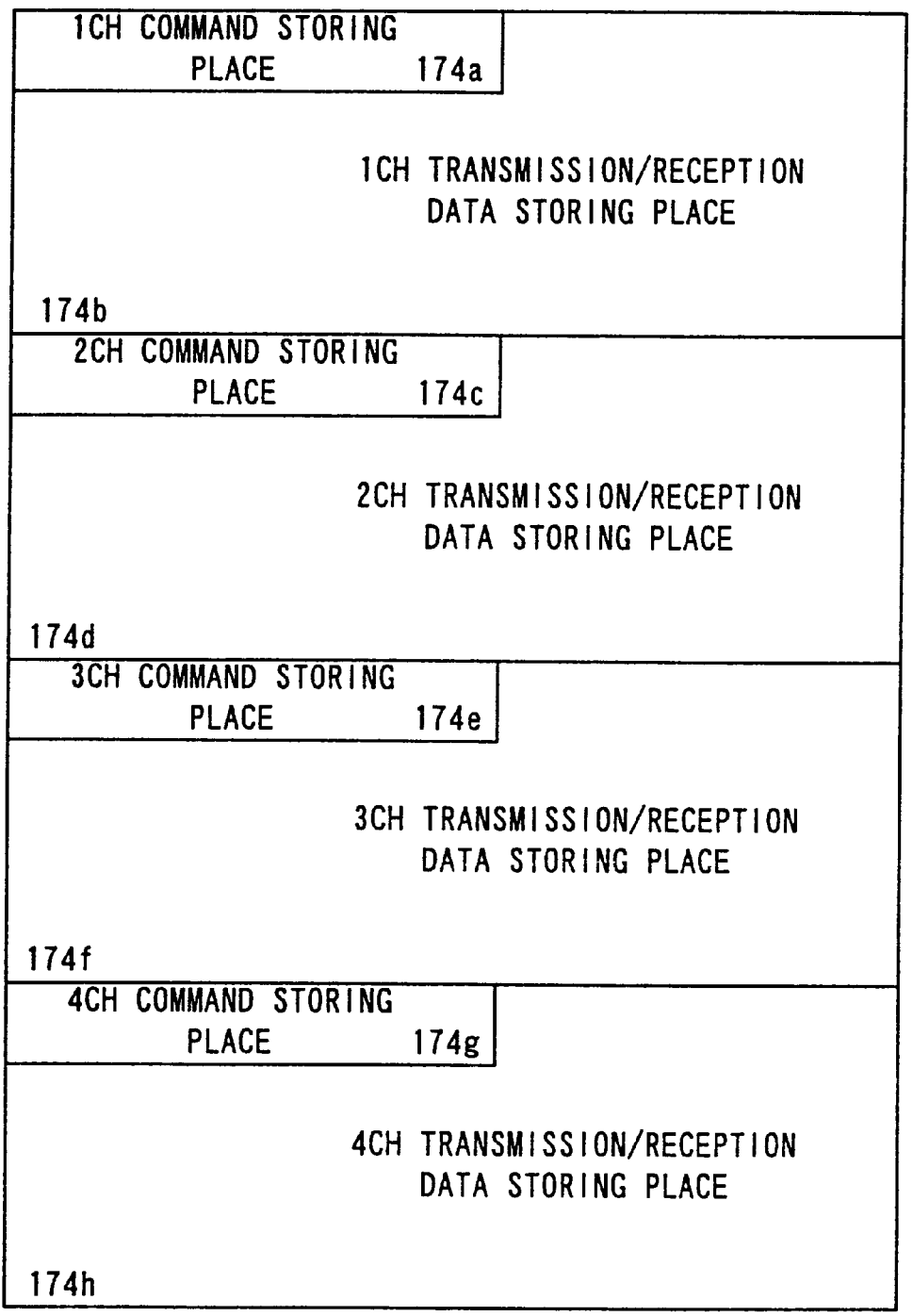
FIG. 6 is a illustrative view showing a memory map of a RAM of FIG. 5.

The RAM 174 of the controller control circuit 17 includes storage areas 174a–174h as shown in a memory map of FIG. 6. More specifically, a command for a first channel is stored in the area 174a, and transmission data and reception data for the first channel are stored in the area 174b. In the area 174c, a command for a second channel is stored, and transmission data and reception data for the second channel are stored in the area 174d. A command for a third channel is stored in the area 174e, and in the area 174f, transmission data and reception data for the third channel are stored. In the area 174g, a command for a fourth channel is stored, and in the area 174h, transmission data and reception data for the fourth channel are stored.

Therefore, the data transfer control circuit 171 functions such that the data transferred from the bus control circuit 12 or the operation status data of the controller 40 received by the reception circuit 173 or the data read-out from the RAM cartridge or controller pack 50 is written in the RAM 174, or the data of the RAM 174 is read-out in response to the instructions from the bus control circuit 12 to be transferred to the bus control circuit 12.

Figure 7:
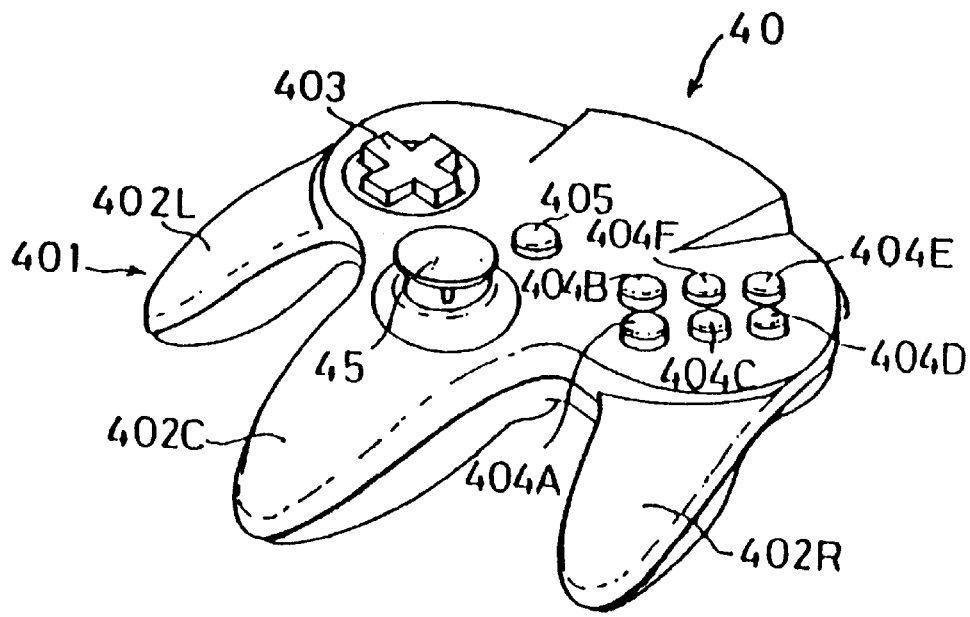
FIG. 7 is a perspective view showing a controller of FIG. 2 while the controller is viewed from an upper portion.
Figure 8:
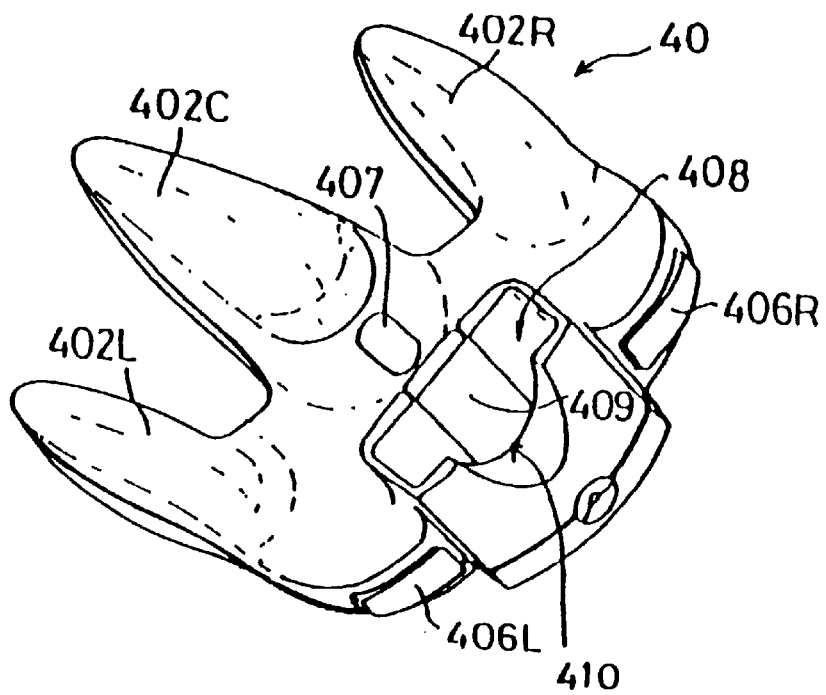
FIG. 8 is a perspective view showing the controller of FIG. 2 while the controller is viewed from a lower portion.

FIG. 7 and FIG. 8 are perspective views of a front surface and a rear surface of the controller 40. The controller 40 has a shape capable of being grasped by both hands or a single hand of a player. An exterior of a housing of the controller includes a plurality of buttons which generates electric signals when depressed and an operation portion which projects in a vertical direction. More specifically, the controller 40 includes by an upper housing and a lower housing. On the housing of the controller 40, an operation portion region is formed on an upper surface having a plain surface shape elongated in a horizontal direction. In the operation portion region of the controller 40, there are a cross type digital direction designation switch (hereinafter, called a "cross switch") 403 on the left side, and a plurality of button switches (hereinafter, simply called a "switches") 404A–404F on the right side, a start switch 405 at an approximately central portion between the cross-switch and the switches, and a joy-stick 45 capable of an analog input at a lower central portion. The cross switch 403 is a direction designation switch for designating a moving direction of an object character or a cursor, and has upper, lower, left and right pressing points. Therefore, the cross switch 403 is used for designating one of four moving directions. The switches 404A–404F have in different functions according to game contents. In a shooting game, for example, the switches 404A–404F are used as firing buttons of missiles. In an action game, for example, the switches 404A–404F are used for designating a various kinds of operations such as a jump, a kick, taking goods and the like. The joy-stick 45 is used as an alternative to cross switch 403 for designating a moving direction and a moving speed of the object; however, it is possible to designate all directions within a range of 360 degrees, and therefore, the joy-stick 45 is utilized as an analog direction designation switch.

In the housing of the controller 40, three grips 402L, 402C and 402R are formed to project downward from three points of the operation portion region. Each of the grips 402L, 402C and 402R has a stick-like shape formed by a palm and middle, third and little fingers of a hand grasping the same. More specifically, the grips 402L, 402C or 402R have a shape that is slightly thinned at a root portion, is made thick at a center portion and is thinned again toward a free end (a lower side in FIG. 7). At an upper central portion of the lower housing of the controller 40, an insertion port 409, to which the RAM cartridge or controller pack 50 which is the expansion device is detachably attached, is formed in a manner that the insertion port 409 projects from a rear surface of the lower housing. Button switches 406L and 406R are provided at the left and right upper side surfaces of the housing and are positioned to be within reach of the left and right index fingers of a player. On a rear surface of the base end portion of the center grip 402c, there is provided with a switch 407 having a function equal to a function of the switch 406L in using the joy-stick 405 instead of the cross switch 403.

A rear surface of the lower housing of the housing is extended toward a direction of a bottom surface, and at a tip end thereof, an opening portion 408 is formed. A connector (not shown) to which the controller pack 50 is connected is provided in the opening portion 408. A lever for discharging the controller pack 50 inserted into the opening portion 408 is formed in the vicinity of the opening portion 408. A notch is formed at an opposite side of the lever 409 in the vicinity of the opening portion 408 into which the control pack 50 is inserted, notch 410 forms a space for withdrawing the controller pack 50 when the controller pack 50 is taken-out using the lever 409.

Figure 9:
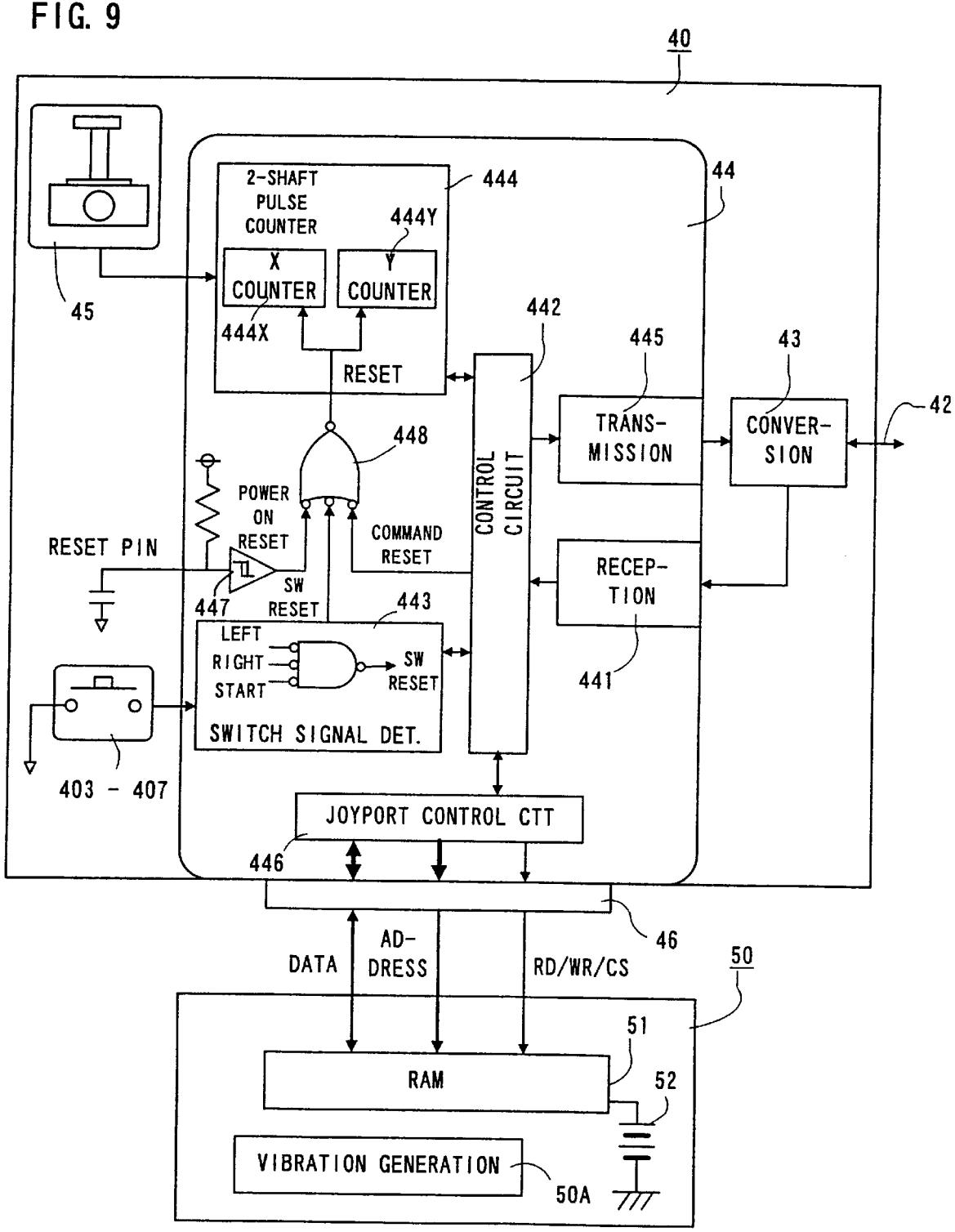
FIG. 9 is a block diagram showing in detail the controller and a controller pack.

FIG. 9 is a detailed circuit diagram showing the controller 40 and the controller pack 50. In addition, in this embodiment shown, the controller pack 50 includes not only a vibration generating circuit 50A that is a feature of this embodiment but also a RAM 51 which functions as an external storage device and a battery 52 for backing-up the RAM 51.

Within the housing of the controller 40, electronic circuits such as an operation signal processing circuit 44 and the like are incorporated, so that the operation status of the respective switches 403–407 or the joy-stick 45 can be detected and the detection data thereof can be transferred to the controller control circuit 17. The operation signal processing circuit 44 includes a reception circuit 441, a control circuit 442, a switch signal detection circuit 443, a counter circuit 444, a transmission circuit 445, a joy-port control circuit 446, a reset circuit 447 and a NOR gate 448.

The reception circuit 441 converts a serial signal such as a control signal transmitted from the controller control circuit 17 and data to be written into the controller pack 50 into a parallel signal which is then applied to the control circuit 442. The control circuit 442 generates a reset signal when the control signal transmitted from the controller control circuit 17 is a reset signal for X-Y coordinates of the joy-stick 45, and resets count values of an X-axis counter 444X and a Y-axis counter 444Y included in the counter circuit 444 via the NOR gate 448. The joy-stick 45 includes photo-interrupters for an X-axis and a Y-axis such that the number of pulses in proportion to an inclined amount which is divided into the X-axis direction and the Y-axis direction are generated, and respective pulse signals are applied to the counter 444X and the counter 444Y. The counter 444X counts the number of the pulses generated according to the inclined amount when the joy-stick 45 is inclined in the X-axis direction. The counter 444 Y counts the number of the pulses generated according to the inclined amount when the joy-stick 45 is inclined in the Y-axis direction. Therefore, as described later, the moving direction and the moving speed of the object or the cursor can be determined by a synthesized vector of amounts of the X-axis and the Y-axis respectively determined by the count values of the counter 444X and the counter 444Y.

In addition, the count values of the counter 444X and the counter 444Y can be reset by a reset signal applied from the reset signal generation circuit 447 when turning-on an electric power switch or a reset signal applied from the switch signal detection circuit 443 at a time that two predetermined switches are simultaneously depressed by the player.

The switch signal detection circuit 443 reads-in the signals which are changed by depressed states of the cross switch 403, and the switches 404A–404F, 405, 406L, 406R and 407 in response to a command signal for outputting the switch status being applied from the control circuit 442 at predetermined intervals (for example, 1/30 of a frame period of a standard television system), and applies the signals to the control circuit 442.

The control circuit 442 applies the operation status data of the respective switches 403–407 and the count values of the counters 444X and 444Y in an order of a predetermined data format in response to a command signal for reading-out the operation status data from the controller control circuit 17. The transmission circuit 445 converts these parallel signals being outputted from the control circuit 442 into serial data, and then, transfers the serial data to the controller control circuit 17 via the conversion circuit 43 and the signal line 42.

Furthermore, the port control circuit 446 is connected to the control circuit 442 via an address bus and a data bus and a port connector 46. The port control circuit 446 performs an input/output control (or a transmission/reception control) of the data according to instructions of the CPU 11 at a time that the controller pack 50 (which is one example of the expansion device) is connected to the port connector 46. In the controller pack 50, the RAM 51 is connected to the address bus and the data bus, and the controller pack 50 includes the battery 52 for supplying electric power to the RAM 51. The RAM 51 is a RAM having a capacity less than a half of a maximum memory capacity capable of being accessed using the address bus, and having 256 k bits, for example. The RAM 51 stores back-up data associated with the game, and even if the controller pack 50 is taken-out from the port connector 46, the RAM 51 holds the storage data by receiving the electric power supply from the battery 52. In addition, the vibration generating circuit 50A included in the controller pack 50 will be described later.

FIG. 10 is an illustrative view showing a data format that the image processor reads-out the data indicative of the operation status of the switches 403–407 and the joy-stick 45 from the controller 40. The data generated by the controller 40 is constituted of 4 bytes. First byte data includes B, A, G, START, UP, DOWN, LEFT, RIGHT UP show that the switches 404B, 404A, 407, 405 and respective depressing points of up, down, left and right of the cross switch 403 are depressed. If the B button, i.e. the switch 404B is depressed, for example, a most significant bit of the first byte data becomes "1". Second byte data includes JSRST, 0 (not used in this embodiment), L, R, E, D, C and F if show that the switches 409, 406L, 406R, 404E, 404D, 404C and 404F are depressed. Third byte data indicates an X coordinate that is a value according to an inclined angle in the X-axis direction of the joy-stick 45 (i.e. the count value of the X counter 444X) in a form of binary numbers. Fourth byte data indicates a Y coordinate that is a value according to an inclined angle in the Y-axis direction of the joy-stick 45 (i.e. the count value of the Y counter 444Y) in a form of binary numbers. Since the X coordinate and the Y coordinate are respectively indicated by the binary numbers of 8 bits, if the X coordinate and the Y coordinate are converted into decimal numbers, it is possible to indicate the inclined angle of the joy-stick 45 by a numerical value from 0 to 255. Furthermore, if the most significant bit is utilized as a signature indicative of a negative value, the inclined angle of the joy-stick 45 can be represented by a numerical value from −128 to +127.

Figure 11:
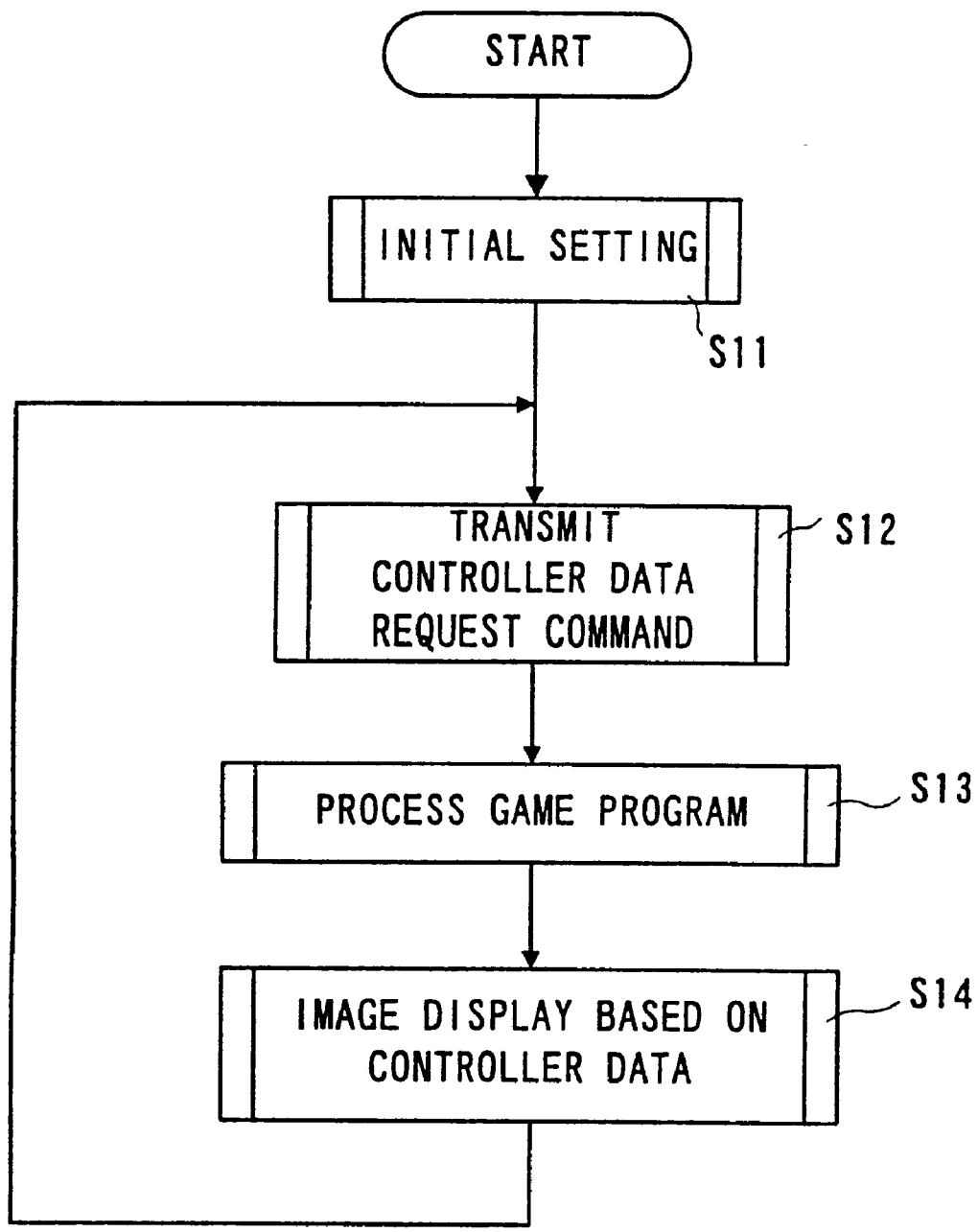
FIG. 11 is a flowchart showing an operation of a CPU of FIG. 2.

Next, operations concerning the data transmission/reception between the image processor 10 and the controller 40, and a moving control of the object character according to the data from the controller 40 will be described. First referring to a flowchart that is shown in FIG. 11 and for the CPU 11 of the image processor 10, an image processing operation will be described. In a step S11, the CPU 11 performs an initial setting on the basis of initial values (not shown) stored in the program data area 202 shown in FIG. 4. In the step S11, the CPU 11 sets an initial value of the moving speed of the object into the speed data area 142 (FIG. 4) of the RAM 14, for example.

Next, in a step S12, the CPU 11 outputs a control pad or controller data request command being stored in the program data area 202 to the RCP or bus control circuit 12. Therefore, in the step S12, the CPU receives commands shown in FIG. 10 from the controller 40, and stores the commands in command storage locations 174a–174d of the respective channels. Therefore, at this time, the count values of the X counter 444X and the Y counter 444Y are applied to the CPU 11 as the X-Y coordinates data.

Next, in a step S13, the CPU 11 performs a predetermined image processing operation on the basis of the program being stored in the program data area 202 and the data stored in the image data area 201 shown in FIG. 4. Furthermore, during execution of the step S13 by the CPU 11, the bus control circuit 12 executes steps S21–S24 shown in FIG. 12. Next, in a step S14, the CPU 11 outputs the image data on the basis of the control pad or controller data being stored in the control pad or controller data area 141 shown in FIG. 4. After the step S14, the CPU 11 repeatedly executes the steps S12 to S14.

An operation of the RCP or bus control circuit 12 will be described referring to FIG. 12. In the step S21, the bus control circuit 12 determines whether or not the controller data request command (a request instruction for the switch data of the controller 40 or the data of the controller pack 50) is outputted by the CPU 11. If no controller data request command is outputted, the bus control circuit 12 waits for the command. If the controller data request command is outputted, the process proceeds to the step S22 wherein the bus control circuit 12 outputs a command for reading the data of the controller 40 into the controller control circuit 17. Next, in the step S23, the bus control circuit 12 determines whether or not the data of the controller 40 is received by the controller control circuit 17 and stored in the RAM 174. The bus control circuit 12 waits in the step S23 if the controller control circuit 17 receives no data from the controller 40 and no data is stored in the RAM 174. If the data from the controller 40 is received by the controller control circuit 17 and stored in the RAM 174, the process proceeds to the step S24. In the step S24, the bus control circuit 12 transfers the data of the controller 40 being stored in the RAM 174 of the controller control circuit 17 to the RAM 14. The bus control circuit 12 returns to the step S21 after the data transfer to the RAM 14, and repeatedly executes the steps S21–S24.

Figure 12:
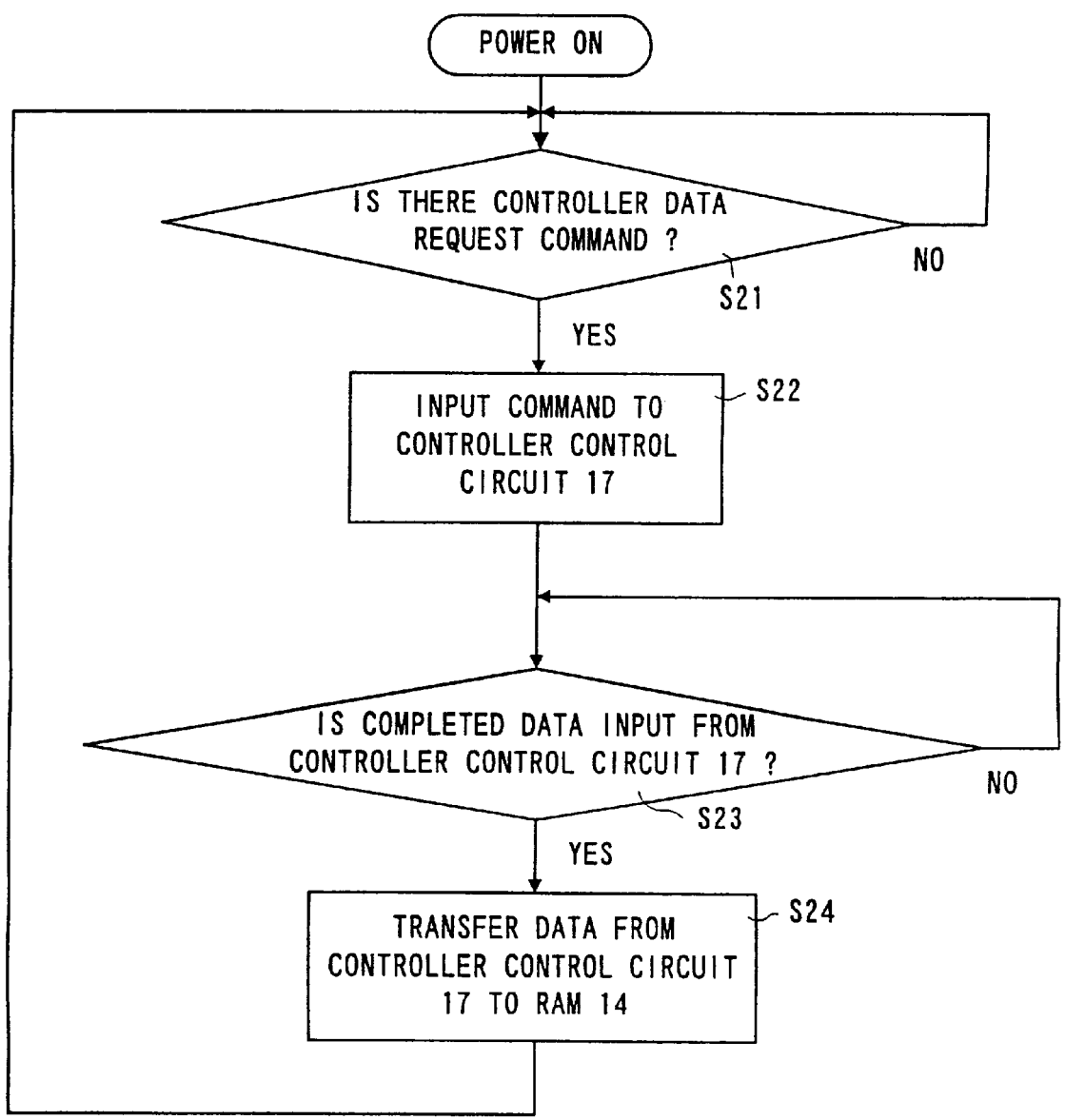
FIG. 12 is a flowchart showing an operation of the bus control circuit of FIG. 2, i.e. a RCP (Reality Co-Processor) of FIG. 3.

In addition, in the flowcharts of FIGS. 11 and 12, one example is that the CPU 11 processes the data stored in the RAM 14 after the data is transferred from the RAM 174 to the RAM 14 by the bus control circuit 12; however, the data in the RAM 174 may be directly processed by the CPU 11 via the bus control circuit 12.

Figure 13:
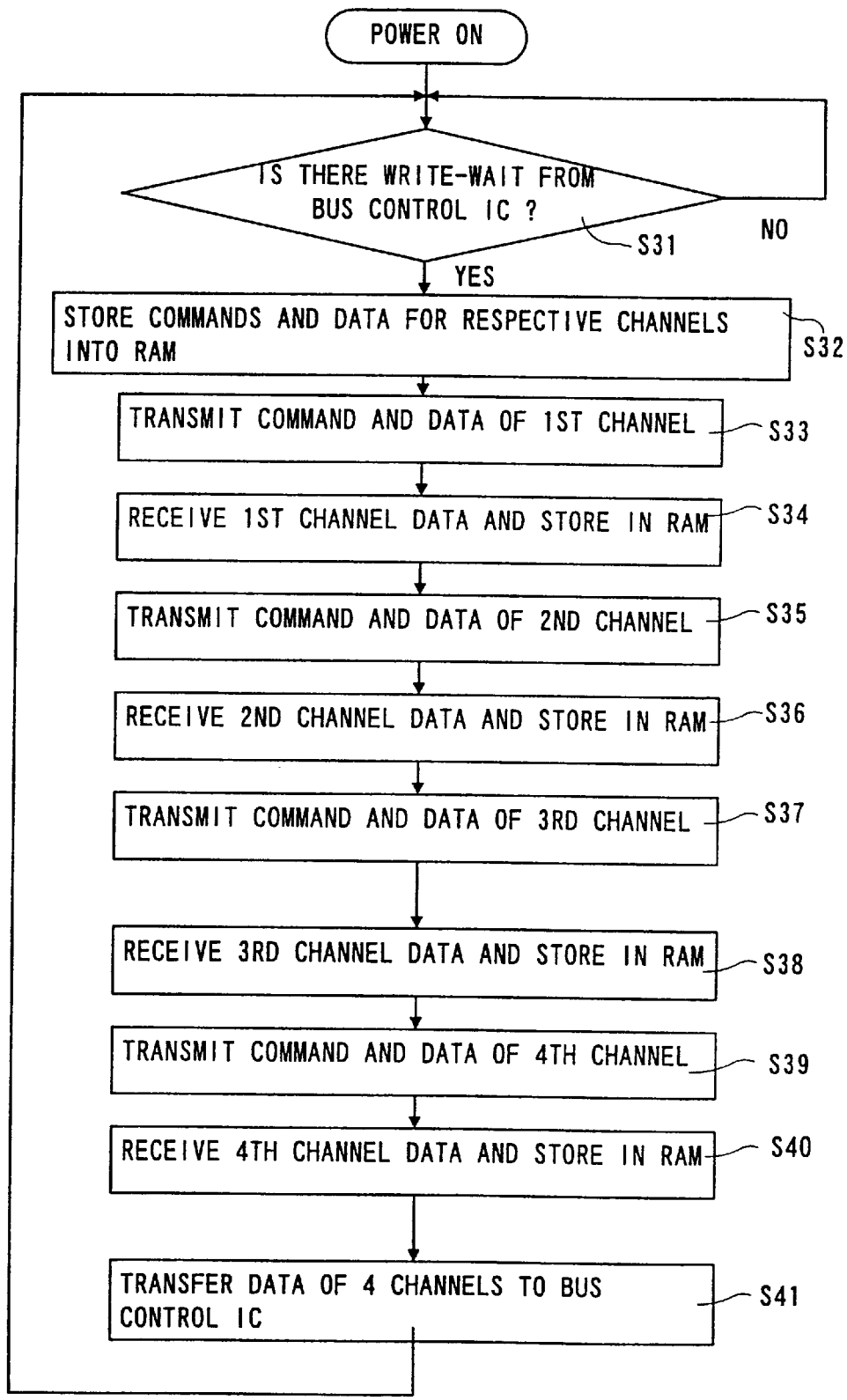
FIG. 13 is a flowchart showing an operation of the controller control circuit of FIG. 2.

FIG. 13 is a flowchart showing an operation of the controller control circuit 17. In a step S31, it is determined whether or not there is no writing of the data from the bus control circuit 12 is waited-for. If there is no a waiting state, the data transfer control circuit 171 waits for the data to be written from the bus control circuit 12. If the data to be written from the bus control circuit 12 exists, in a next step S32, the data transfer control circuit 171 stores the commands and/or data (hereinafter, simply called "commands/data") for the first to fourth channels in the RAM 174. In a step S33, the commands/data of the first channel are transmitted to the controller 40 connected to the connector 181. The control circuit 442 performs a predetermined operation on the basis of the commands/data, and outputs data to be transmitted to the image processor 10. A content of the data will be described later in the description of an operation of the control circuit 442. In a step S34, the data transfer control circuit 171 receives the data outputted from the control circuit 442, and stores the data in the RAM 174.

Thereafter, similar to the operation for the first channel in the steps S33 and S34, in a step S35, the commands/data of the second channel are transmitted to the controller 40. The control circuit 442 performs a predetermined operation on the basis of the commands/data, and outputs data to be transmitted to the image processor 10. In a step S36, the transfer and writing operation of the data for the second channel are executed. Furthermore, in a step S37, the commands/data of the third channel are transmitted to the controller 40. The control circuit 442 performs a predetermined operation on the basis of the commands/data to output data to be transmitted to the image processor 10. In a step S38, the transfer and writing operation of the data for the third channel is performed. Furthermore, in a step S39, the commands/data of the fourth channel are transmitted to the controller 40. The control circuit 442 of the controller 40 performs a predetermined operation on the basis of the commands/data, and then, outputs data to be transmitted to the image processor 10. In a step S40, the transfer and writing operation of the data for the fourth channel is performed. In a succeeding step S41, the data transfer control circuit 171 transfers the data received in the steps S34, S36, S38 and S40 together to the bus control circuit 12.

As described above, the data of the first channel to the fourth channel, that is, the commands for the respective controller 40 connected to the connectors 181–184 and the operation status data to be read-out from the controller 40 are transferred between the data transfer control circuit 171 and the control circuit 442 of the respective controllers 40 in a time-division process.

Figure 14:
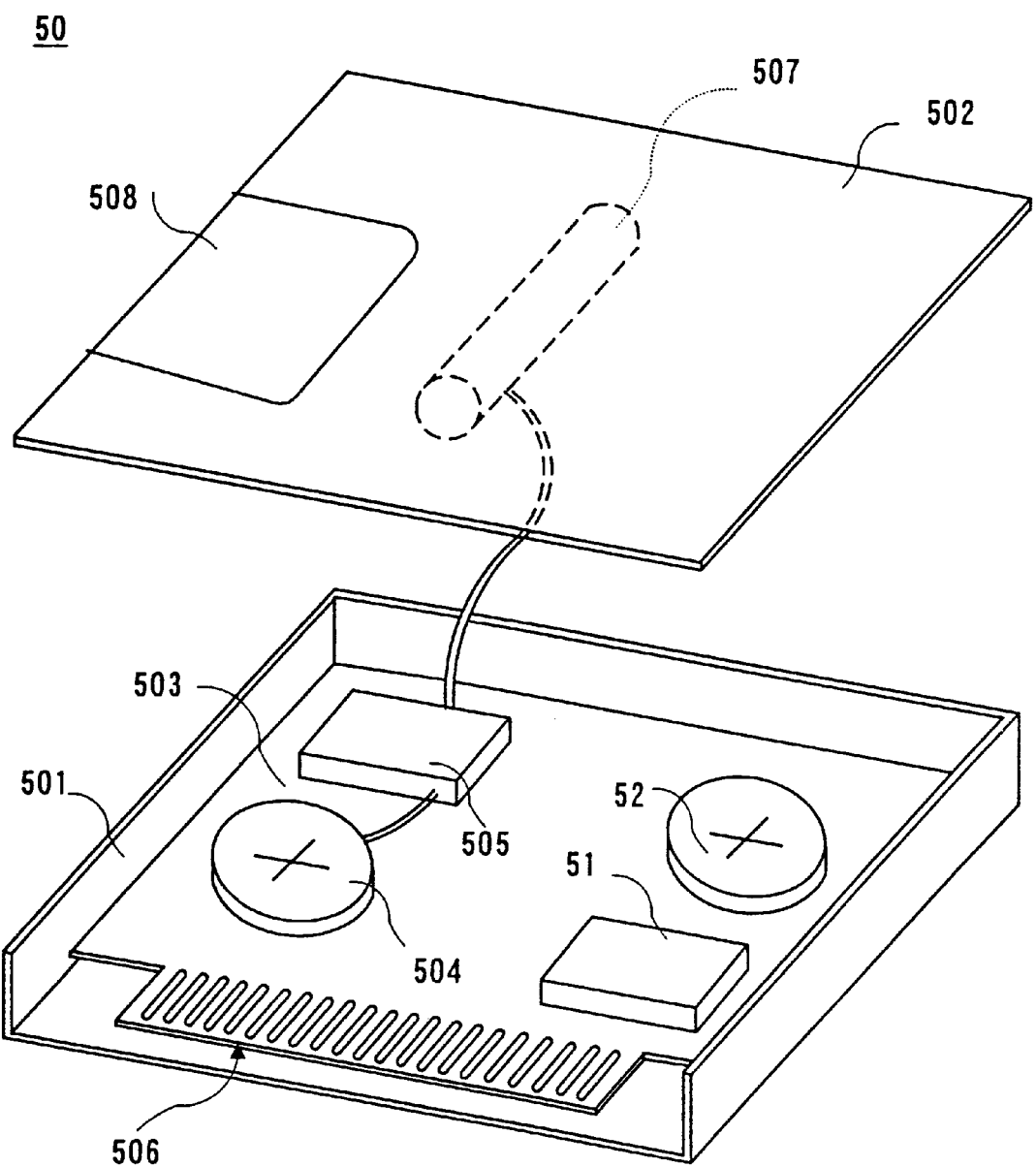
FIG. 14 is a fragmentary perspective view showing the controller pack which is one embodiment according to the present invention.

Referring to FIG. 14, the controller pack 50 will be described in detail. The controller pack 50 includes a case 501 and a lid 502 detachably attached to the case 501. The controller pack 50 formed by the case 501 and the lid 502 is detachably attached to the opening portion 408 shown in FIG. 8.

Within the case 501, a printed circuit board 503 is accommodated. On the printed circuit board 503, other than the aforementioned RAM 51 and back-up battery 52, a battery 504 and a driver circuit 505, both constituting a part of the vibration generating circuit 50A shown in FIG. 9, are mounted. In addition, on a front edge of the printed circuit board 503, a plurality of terminals 506 connected to the connector (not shown) formed on the opening portion 408 of the controller 40 shown in FIG. 8 are provided. The terminals 506 receive the data and the address from the CPU 11 (FIG. 2) of the game machine 10, i.e. from the controller control circuit 17.

A vibration source 507 constituting a part of the vibration generating circuit 50A is fixed to the lid 502. In this embodiment shown, a vibration as the vibration source 507 generating motor is utilized. However, other than the motor, a solenoid or other elements which generate a vibration when receiving electric power may be utilized. In addition, one of the vibration generating motors, "FM16, FM23, FM25 or FM29" or "CM-5" manufactured by Tokyo Parts Industry can be utilized. In the "FM" motor, an eccentric member is attached to a rotation shaft incorporated in a cylindrical case, and the eccentric member is rotated according to a rotation of the rotation shaft, and therefore, the vibration is generated on the case. In the "CM" motor, an armature coil itself is mounted in an eccentric manner, and by rotating the armature, the vibration is generated. In addition, if the solenoid is utilized, a core within the solenoid is reciprocally moved, and accordingly, the vibration is generated.

In any cases, the vibration source 507 is driven by the driver circuit 505 when receiving the electric power from the battery 504 to generate the vibration. The consumption of electric power by the vibration source 507 is relatively large, and therefore, in this embodiment, the battery 504 is provided in addition to the back-up battery 52 for the RAM 51. Therefore, if the battery 504 is consumed, by opening a battery lid 508 which is detachably attached to the lid 502, the battery 504 can be exchanged by a new battery. However, it is possible to commonly use a single battery in place of the two batteries 52 and 504.

Furthermore, by including an electric power supply line in the controller cable 42 (FIG. 2), the electric power may be supplied to the vibration source 507 by the electric power supply line through the terminals 506 from the image processor or game machine 10. In such a case, a capacity of the electric power supply line may be suitably determined by taking necessary electric power for the vibration source 507.

Furthermore, in this embodiment shown, the vibration source 507 is attached to the lid 502 such that the vibration generated by the vibration source 507 can be easily conveyed to the hands of the player from the controller 40 without attenuation. That is, the vibration generated by the vibration source 507 is conveyed from the lid 502 to the opening portion 408 (FIG. 8) of the controller 40 with which the lid 502 is brought into contact, and therefore, the controller 40 itself is vibrated. Accordingly, the vibration generated by the vibration source 507 is conveyed to the hands of the player grasping the controller 40. Therefore, if the vibration of the vibration source 507 can be conveyed to the hands of the player, it is possible to attach the vibration source 507 at an arbitrary position within the case 501. However, it is preferable that the vibration source not be mounted on the printed circuit board 503. This is because the vibration of the vibration source 507 affects components mounted on the printed circuit board 503, and because the terminals 506 and the connector are brought into elastic contact with each other and there is a possibility that the vibration of the vibration source 507 is attenuated by such an elastic contact, and so on.

Next, referring to FIG. 15, the driver circuit 505 will be described in detail. The driver circuit 505 includes a decoder composed of a NAND gate 510, and the NAND gate 510 receives address data A2–A14 from the CPU 11 (FIG. 2) of the game machine 10 via the address bus and the terminals 506 (FIG. 14). In the game system of this embodiment shown, since the address A15 of the CPU 11 is not used normally, in a case where the address A15 and the addresses A2–A14 are all "1", that is, the CPU 11 designates a range of the addresses FFFC–FFFF, a vibration mode is set, and therefore, the data for driving the vibration source 507 is outputted from the CPU 11. More specifically, if the CPU addresses FFFC–FFFF are designated, an output of the decoder or NAND gate 510 becomes "0". The output of the NAND gate 510 is applied to a NAND gate 511 which is further supplied with a write signal –WE and a chip enable signal CE both from the CPU 11. Therefore, the NAND gate 511 applies a latch signal to a latch 512 in response to the output of the NAND gate 510 and the signals –WE and CE. Accordingly, the latch 512 latches the CPU data D0–D2 via the data bus and the terminals 506 at a time that the CPU 11 designates the addresses FFFC–FFFF.

The CPU data D0–D2 is data for setting a strength of the vibration to be generated by the vibration source 507, and it is possible to set strength levels of "1–8" with utilizing three bits of the data. That is, if the data D0–D2 is "100", the strength "1" is set, and if "111", the strength "7" is set. That is, the latch 512 has three outputs, and respective outputs are connected to a base of a driver transistor 514 via resistors 513a, 513b and 513c. Resistance values of the resistors 513a, 513b and 513c are 4R, 2R and R, respectively. Therefore, if the "1" are outputted on all the three outputs, a maximum base voltage is applied to the transistor 514, and if the three outputs are "1","0" and "0", a minimum base voltage is applied to the transistor 514. Accordingly, a controller-emitter current of the transistor 514 is changed, and in response thereto, a driving current flowing from the battery 504 to the vibration source 507 (vibration motor) is changed. That is, by suitably setting data on the data bits D0–D2 of the data bus, it is possible to variably set the strength of the vibration generated by the vibration source 507.

Figure 15:
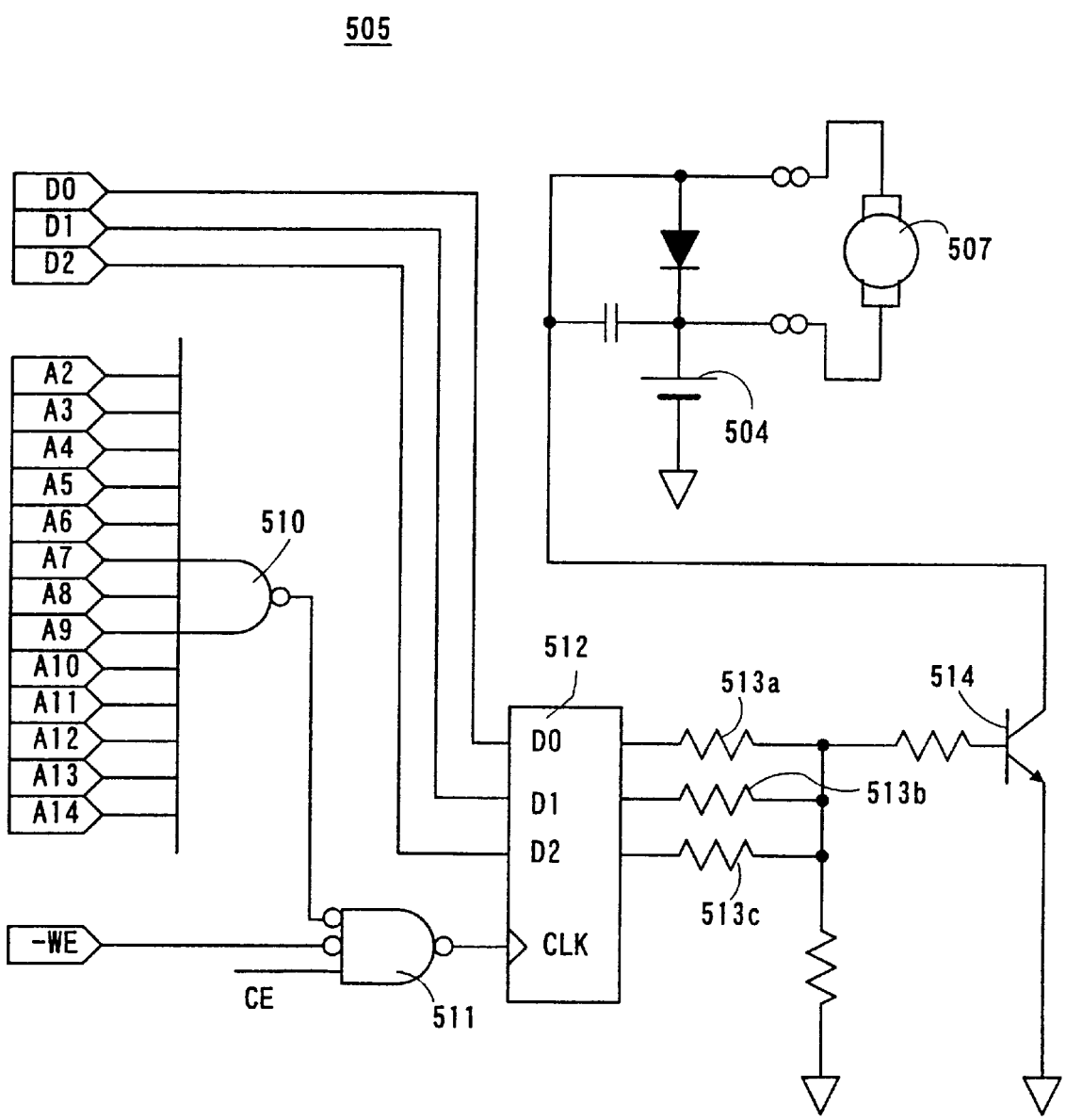
FIG. 15 is a circuit diagram showing one example of a driver circuit of FIG. 14.
Figure 16:
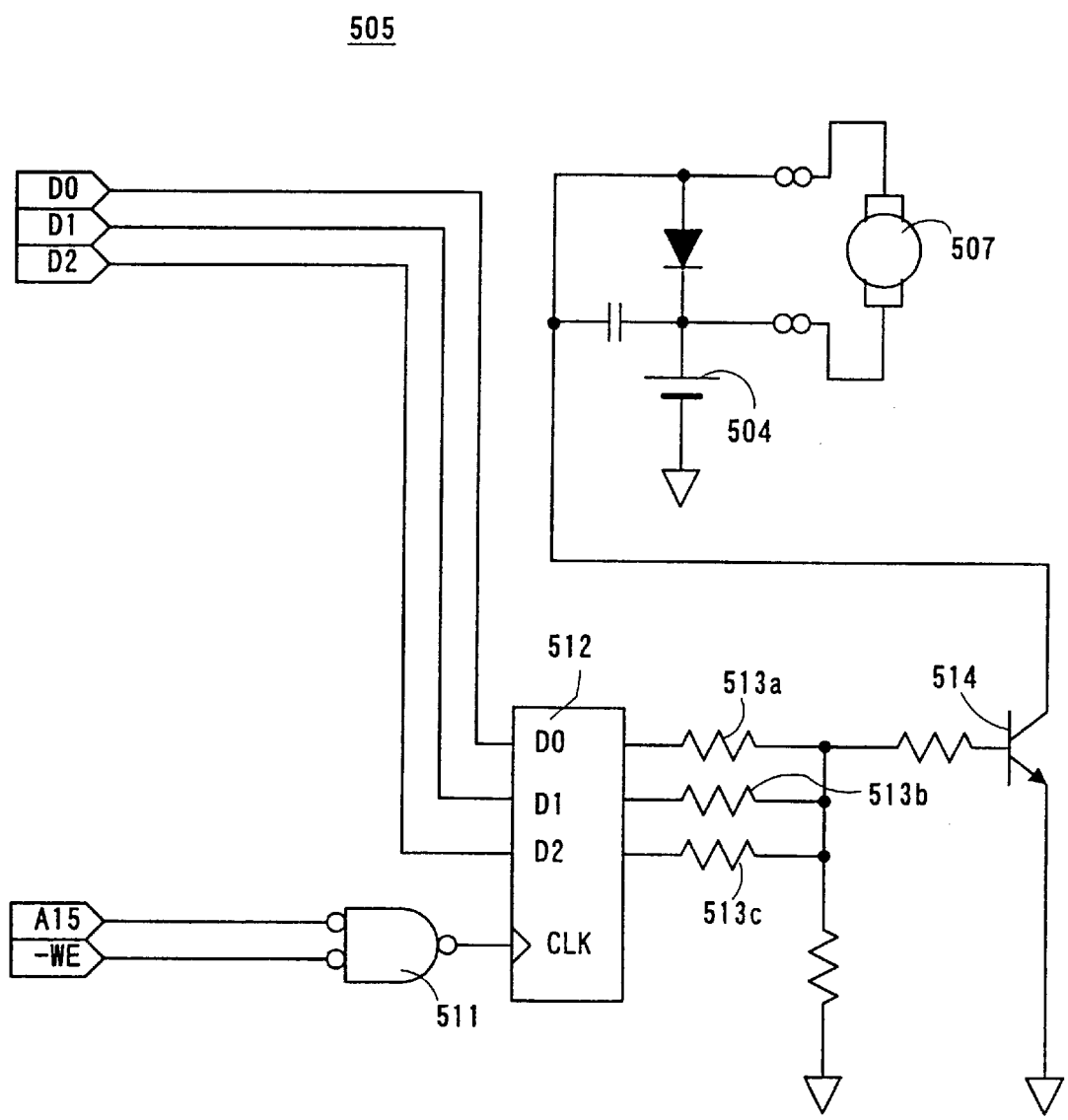
FIG. 16 is a circuit diagram showing another example of the driver circuit of FIG. 14.

In addition, FIG. 15 embodiment can be modified as shown in FIG. 16. The FIG. 16 embodiment is different from the FIG. 15 embodiment in that the decoder 510 of FIG. 5 is not utilized. That is, in the FIG. 16 embodiment, the address bit A15 of the CPU 11 is directly applied to the NAND gate 511. Therefore, the NAND gate 511 applies the latch signal to the latch 512 in response to the write signal –WE of the CPU 11. Therefore, in the FIG. 16 embodiment, the vibration mode is also set at a time that the address bit A15 of the CPU 11 becomes "1", and the CPU data bits D0–D2 are latched by the latch 512, and the driver transistor 514 is controlled by the data.

In addition, the vibration source 507 may be controlled utilizing the data bit D0 of the data bus of the CPU 11 only, for example. In this case, the latch 512 shown in FIG. 15 or FIG. 16 latches the data of the data bit D0 in the vibration mode. Then, the latch 512 has only a single output, and the output applies the voltage to the base of the transistor 514. Therefore, in this case, the transistor 514 is simply turned-on or -off by "1" or "0" of the data bit D0, and therefore, the strength of the vibration by the vibration source 517 is constant.

Figure 17:
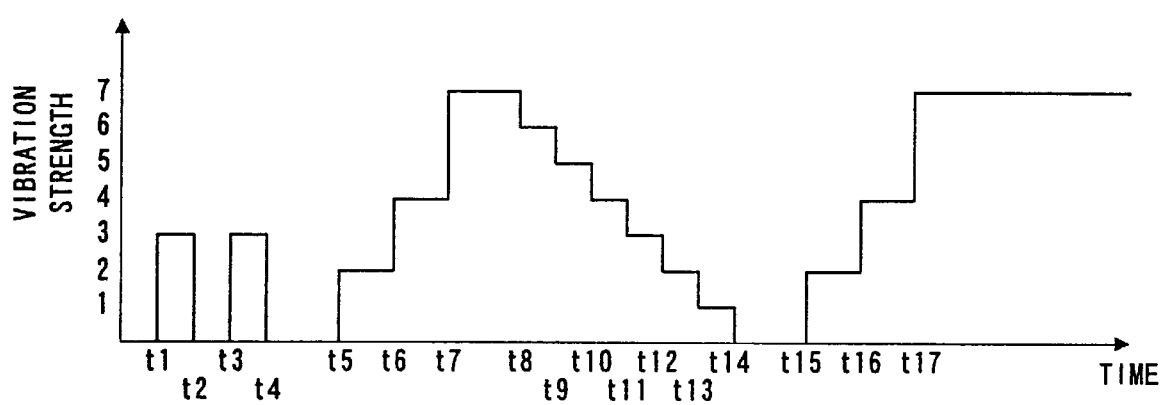
FIG. 17 is an illustrative view showing timings that vibrations are generated by a vibration source in one example of games in which the controller pack according to the embodiment is used.

In FIG. 17, one example of a vibration generating pattern in "Fishing Game" is shown. In "Fishing Game", by generating the vibration in each scene such as "bait picking" that the fish picks the bait, "catching" that the fish is hooked by a fishing hook, or "boating" that the fish is boated, it is possible to apply further actual feeling of "Fishing Game" to the player.

During the times t1–t4 in FIG. 17, a vibration pattern at a time of "bait picking" is shown. In "bait picking", since the fish only picks the bait on the fishing hook, it is unnecessary to generate a large vibration. Therefore, in this embodiment, at the time t1, the CPU 11 outputs "1" on its address A15 and "110" on the data bits D0, D1 and D2. In response to the data of "110", "0" (0 volts, for example) is outputted at a lowest output of the latch 512 and "1" (3 volts, for example) is outputted at each of upper outputs. Therefore, the transistor 514 is turned-on at the time t1 to apply a driving current having a magnitude equal to the vibration level "3" to the vibration source (motor) 507. Therefore, the vibration of the level "3" is generated at the time t1, and the vibration is conveyed to the hands of the player as described above. Accordingly, it is possible for the player to actually feel by the vibration that "bait picking" is now being performed.

Then, the CPU 11 makes the address A15 and the data bits D1–D2 all "0" at the time t2. Therefore, the transistor 514 is turned-off, and the driving current for the vibration source 507 is also turned-off, and accordingly, the vibration of the controller pack, i.e. the vibration of the controller is stopped.

In order to notify that "bait picking" is performed again to the player, the CPU 11 outputs "1" on the address A15 and "110" on the data bits D0–D2 at the time t3. Therefore, at the time t3, the vibration of the level "3" is generated by the vibration source 507, and the vibration is conveyed to the hands of the player. Therefore, the player can actual feel that "bait picking" is now being performed on the basis of the vibration.

Then, the CPU 11 makes the address A15 and the data bits D0–D2 all "0" at the time t4. Accordingly, the transistor 514 is turned-off, and the driving current to the vibration source 507 is turned-off, and the vibration on the controller pack or the controller is stopped.

Next time t5 to t14 indicate a vibration pattern of "catching", and in this case, the CPU 11 outputs "1" on the address A15 and "010" on the data bits D0–D2 at the time t5. In response to the data of "010", "1" (e.g. 3 volts) is outputted at a middle output of the latch 512, and "0" (e.g. 0 volt) is outputted on each of the upper and lower outputs. Therefore, at the time t5, the transistor 514 is turned-on such that the driving current having a magnitude equal to the vibration level "2" can be applied to the vibration source (motor) 507. Therefore, at the time t5, the vibration of the level "2" is generated by the vibration source 507, and the vibration is conveyed to the hands of the player. Therefore, the player can actually feel that "catching" is now being performed. Similarly, the CPU 11 outputs "1" on the address A15 and "101" on the data bits D0–D2 at the time t6. In response to the data of "101", "1" (3 volts, for example) is outputted at each of the upper and lower outputs of the latch 512. Accordingly, at the time t6, the transistor 514 is turned-on so as to apply the driving current having a magnitude equal to the vibration level "4" to the vibration source (motor) 507. Therefore, the vibration of the level "4" is generated by the vibration source 507 at the time t6, and the vibration is conveyed to the hands of the player. Furthermore, the CPU 11, at the time t7, outputs "1" on the address A15 and "111" on the data bits D0–D2. In response to the data of "111", 3 volts, for example, are outputted at all the outputs of the latch 512. Accordingly, at the time t7, the transistor 514 is turned-on such that the driving current having a magnitude equal to the vibration level "7" is applied to the vibration source (motor). Therefore, at the time t7, the vibration of the level "7" is generated by the vibration source 507 and the vibration is conveyed to the hands of the player.

Furthermore, the CPU 11 outputs "1" on the address A15 and "011" on the data bits D0–D2 at the time t8. In response to the data of "011", 3 volts, for example, are outputted at upper two outputs of the latch 512. Therefore, at the time t8, the transistor 514 applies the driving current having a magnitude of the vibration level "6" to the vibration source (motor) 507. Accordingly, at the time t8, the vibration of the level "6" is generated from the vibration source 507, and the vibration is then conveyed to the hands of the player. As similar to the above, during "catching", the CPU 11 respectively outputs data "101", "001, "110", "010" and "100" at the times t9, t10, t11, t12, t13 and t14. Therefore, at the times t9, t10, t11, t12, t13 and t14, the vibration source 507 generates the vibration at the level "5", "4", "3", "2" and "1", and the vibrations are conveyed to the player. Therefore, during the times t5–t14, the player can actually feel that "catching" is performed on the basis of the vibrations a level of which is gradually increased and decreased.

After a next time t15, a vibration pattern of "boating" is generated. In this case, the CPU 11 outputs "1" on the address A15 and "010" on the data bits D0–D2 at the time t15. In response to the data of "010", "1" (e.g. 3 volts) is outputted at the middle output of the latch 512, and "0" (e.g. 0 volt) is outputted at each of the upper and lower outputs. Therefore, at the time t15, the transistor 514 is turned-on so as to apply the driving current having a magnitude of the vibration level "2" to the vibration source (motor) 507. Therefore, at the time t15, the vibration of the level "2" is generated by the vibration source 507 and the vibration is conveyed to the hands of the player. Similarly, the CPU 11 outputs "1" on the address A15 and "101" on the data bits at a time t16. In response to the data of "001", 3 volts, for example, are outputted the lowest output of the latch 512. Therefore, at the time t16, the transistor 514 applies the driving current having a magnitude equal to the vibration level "4" to the vibration source 507. Therefore, at the time t16, the vibration of the level "4" is generated by the vibration source 507, and conveyed to the hands of the player. Furthermore, the CPU 11 outputs "1" on the address A15 and "111" on the data bits D0–D2 at a time t17. In response to the data of "111", 3 volts, for example, are outputted all the outputs of the latch 512. Accordingly, at the time t16, the transistor 514 is turned-on such that the driving current having a magnitude equal to the vibration level "7" is applied to the vibration source 507. Therefore, at the time t17, the vibration having the level "7" is generated from the vibration source 507, and then, conveyed to the hands of the player. Thus, the vibration is generated by the vibration source 507 according to the vibration pattern of "boating", and therefore, the player can actually feel that "boating" is performed during that period.

In addition, the controls of the drive and the stop and the vibration strength of the vibration source 507 by the CPU 11 are performed according to the game program in the ROM cartridge 20 or the like. Therefore, if the game program is manufactured in a manner that the generation of the vibration, the stop of the vibration and the vibration strength change occur in response to the change of the image and the sound, it is possible to enjoy a game having extremely actual feeling with using the video game machine for home use.

Furthermore, other than the above described "Fishing Game", in "Racing Game", for example, at a time that "clash" occurs, a game programmer can arbitrarily set times and levels of the vibration strength in any game.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A controller pack detachably attached to a controller which is connected to a video game machine, comprising:

a case;

a vibration source which is attached to said case and generates a vibration using electric power; and a driver circuit which applies said electric power to said vibration source in response to a command signal from said game machine.

2. A controller pack according to claim 1, further comprising a battery provided within said case which supplies said electric power to said vibration source.

3. A controller pack according to claim 1, wherein said electric power is applied by a controller cable which connects said game machine and said controller to each other.

4. A controller pack according to any one of claims 1 to 3, wherein said game machine includes a game processor, said game processor outputting said command signal on a specific address within a predetermined address space, said controller pack further comprising a terminal which receives said command signal on said specific address.

5. A controller pack according to claim 1, wherein said driver circuit includes a strength changing means which changes a strength of the vibration generated by said vibration source.

6. A controller pack according to claim 5, wherein said game machine includes a game processor, said game processor outputting strength data of a plurality of bits and indicative of a vibration strength, and said strength changing means includes a plurality of terminals which receive said strength data of said plurality of bits, and a means which applies a driving current having a magnitude according to the data at said plurality of terminals to said vibration source.

7. A controller pack according to claim 1, further comprising:

a read/write memory.

8. A controller pack according to claim 7, wherein game back-up data is stored in said read/write memory in response to another command signal from said game machine.

9. A game machine system which includes a video game machine, a controller connected to said video game machine, and a controller pack detachably attached to said controller, comprising:

a game processor which is provided in said video game machine and coupled to a bus;

a vibration source which is attached to a case of said controller pack and generates a vibration using electric power;

a signal applying means which is provided on said controller and applies a signal on a first specific bit of said bus and a signal on a second specific bit of said bus to said controller pack;

terminals which are provided in said case and receive said signals from said signal applying means; and a driver circuit which is provided in said case and applies said electric power to said vibration source in response to said signals received at said terminal.

10. For use with video game program executing processing system for executing a video game program, and a player controller being operable by a player to generate video game control signals for the video game program and having a housing adapted to be held by the player; a controller pack comprising:

a case adapted for removable attachment to said housing of said player controller;

a vibration source for vibrating said case; and a driving circuit for driving said vibration source in response to a command signal from said video game program executing processing system, wherein, when said case is attached to said housing of said player controller, vibrations of said case, generated when said driver circuit drives said vibration source, are transferred to said housing of said player controller.

11. A controller pack according to claim 10, further comprising:

a read/write memory.

12. A controller pack according to claim 11, further comprising:

a first battery for supplying power to said vibration source; and a second battery for supplying power to said read/write memory.

13. A controller pack according to claim 11, wherein game back-up data is stored in said read/write memory in response to another command signal from said video game program executing processing system.

14. A controller pack according to claim 10, further comprising:

a battery arranged within said case for supplying power to said vibration source.

15. A controller pack according to claim 10, wherein said driving circuit is adapted to drive said vibration source to produce vibrations of different levels of strength.

16. A video game system comprising:

a video game program executing processing system for executing a video game program;

a hand-held player controller connected to said video game program executing processing system and operable by a player to generate video game control signals for said video game program;

a controller pack comprising a case adapted for removable attachment to said hand-held player controller, a vibration source attached to said case, and a driving circuit for driving said vibration source, wherein, when said case is attached to said hand-held player controller, vibrations of said case, generated when said driving circuit drives said vibration source, are transferred to said hand-held player controller; and a memory media for storing video game instructions for said video game program, said video game instructions including at least one instruction for causing said game program executing processing system to send a command to said driving circuit of controller pack to drive said vibration source.

17. A video game system according to claim 16, wherein said controller pack further comprises a read/write memory.

18. A video game system according to claim 17, wherein said controller pack further comprises:

a first battery for supplying power to said vibration source; and a second battery for supplying power to said read/write memory.

19. A video game system according to claim 16, wherein said memory media comprises a read only memory (ROM) cartridge.

20. A video game system according to claim 16, wherein said driving circuit of said controller pack is adapted to drive said vibration source to produce vibrations of different levels of strength.

* * * * *